April 11, 1939. H. D. HOEKSTRA 2,153,667
AIRPLANE CONTROL
Filed Sept. 11, 1935 2 Sheets-Sheet 2
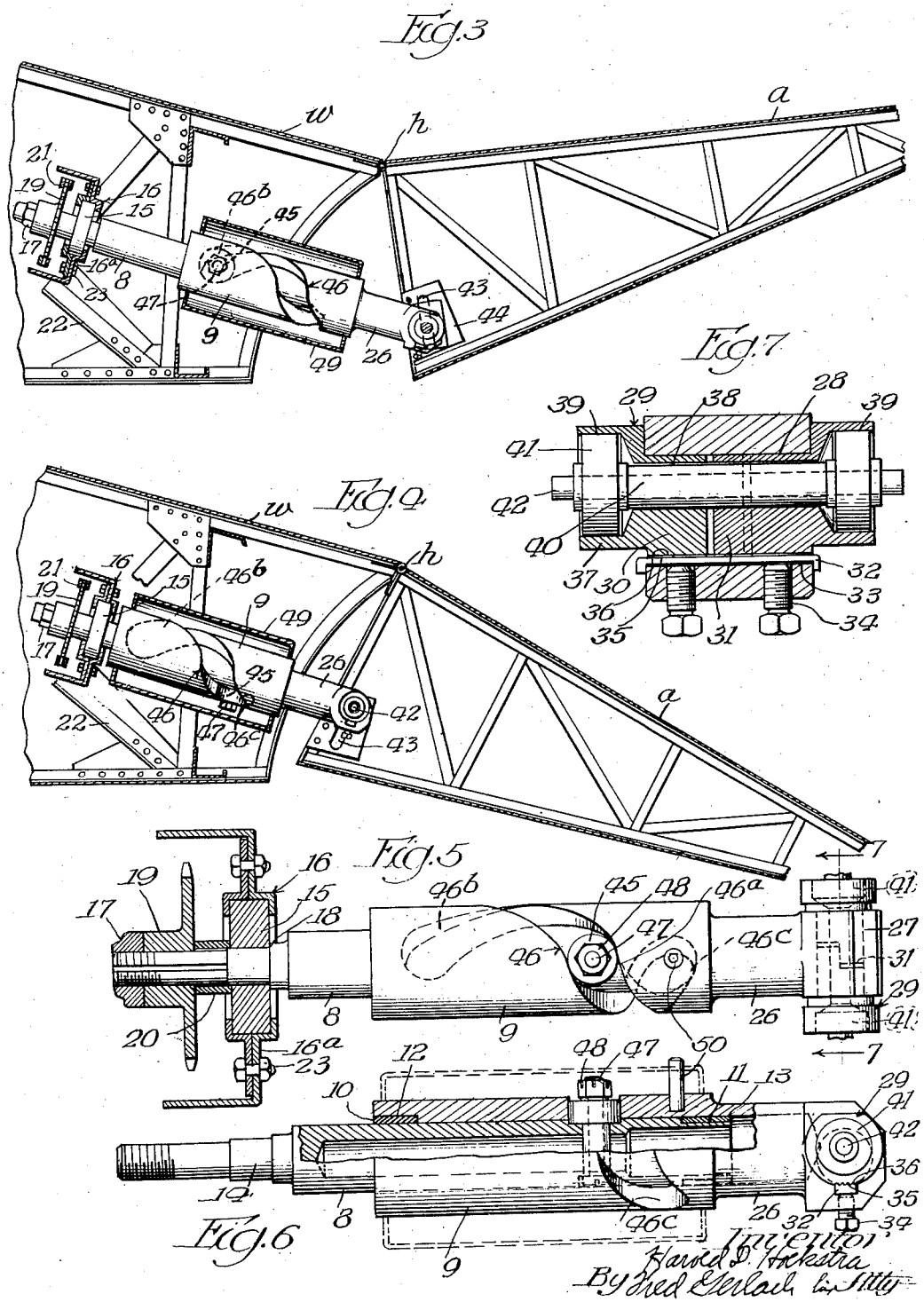

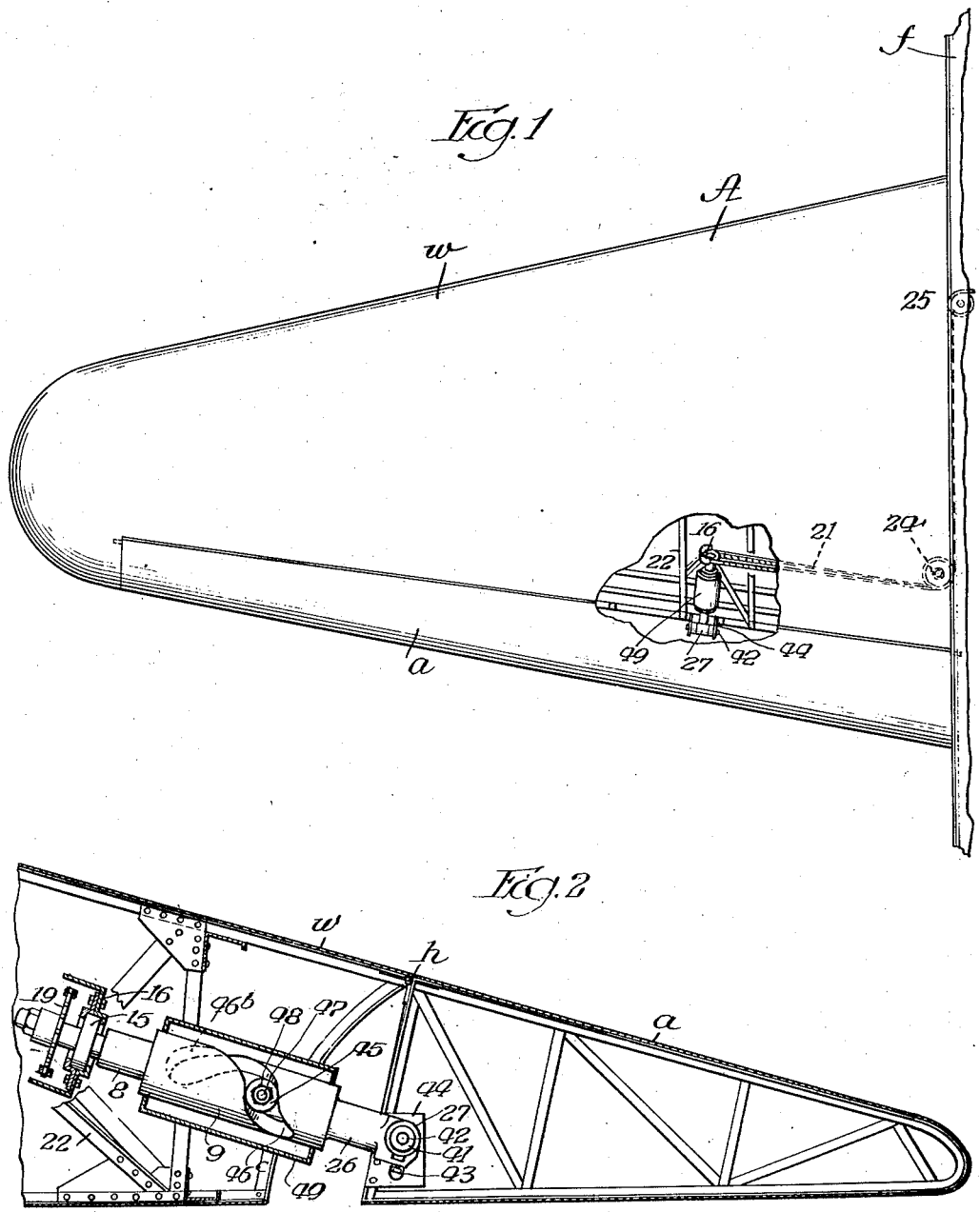

Patented Apr. 11, 1939

2,153,667

UNITED STATES PATENT OFFICE 2,153,667

AIRPLANE CONTROL

Harold D. Hoekstra, Wayne, Mich., assignor, by mesne assignments, to Aviation Manufacturing Corporation, Chicago, Ill., a corporation of Delaware Application September 11, 1935, Serial No. 40,035

2 Claims. (Cl. 244—83)

The present invention relates generally to controls for airplanes. More particularly the invention relates to that type of control which is designed for use in connection with the operation or actuation of an aileron or like control surface.

The primary object of the invention is to provide an improved control which is irreversible when the aileron or control surface is in or near its neutral position and is reversible when the aileron surface is in its other or operative positions and hence operates to control the aileron so that it is locked or held against fluttering when in, or near, its neutral position, and when in its other or operative positions tends to return to its neutral position, thus giving the pilot of the airplane "control feel" of it.

Another object of the invention is to provide an airplane control of the type under consideration which is generally of new and improved construction and operates in an efficient and simple manner.

Other objects of the invention and the various advantages and characteristics of the present airplane control construction will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a fragmentary plan view showing an airplane wing, the aileron of which is controlled or operated from the pilot's compartment by a control embodying the invention;

Figure 2 is an enlarged, transverse sectional view of the wing showing the position of the parts of the control when the aileron is in its neutral position;

Figure 3 is a similar sectional view showing in detail the position of the parts of the control when the aileron is raised;

Figure 4 is a view similar to Figure 3 showing the position of the parts of the control when the aileron is in its lowered position;

Figure 5 is a plan view of the plunger and sleeve which constitute the main or primary parts of the control;

Figure 6 is a view partly in section and partly in side elevation of the parts of the control shown in Figure 5; and Figure 7 is an enlarged section taken on the line 7—7 of Figure 5 and showing in detail the construction and arrangement of the means for adjusting the pivotal connection between the rear end of the sleeve and the aileron.

The control which forms the subject matter of the invention is designed for use in connection with an airplane A. The latter is illustrated in a fragmentary manner in the drawings and consists of a fuselage $f$ and a wing $w$. The wing $w$ is associated with and projects laterally from one side of the fuselage and has at the trailing edge thereof an aileron $a$ for controlling lateral stability of the airplane and also for use in banking the plane when the latter is turned abruptly in landing or take-off maneuvers. As shown in the drawings the aileron $a$ is disposed in a pocket in the trailing margin of the wing $w$ and is connected by a hinge $h$ to the wing so that it may be swung upwards and downwards from a neutral position wherein the top and bottom faces thereof are substantially coplanar with the top and bottom faces of the wing $w$ respectively. The hinge $h$ is located at the upper front corner of the aileron and the pocket forming part of the trailing portion of the wing $w$ is cut away as illustrated in order to permit of ready downward swinging of the aileron. The fuselage $f$ of the airplane A has in the front thereof a pilot's compartment (not shown) and has in this compartment, as well understood in the art, a vertically extending control stick which is connected at its lower end so as to swing forwards and rearwards and has the usual aileron controlling or actuating hand-wheel at its upper end.

The improved control is operated by the hand-wheel at the upper end of the control stick in the pilot's compartment of the airplane and, as hereinafter described, serves when the hand wheel in turned by the pilot in one direction to raise or elevate the aileron $a$ and when the hand-wheel is turned in the reverse or opposite direction to lower the aileron. It is disposed for the most part within the wing $w$ of the airplane A and comprises as the main or essential parts thereof a plunger 8 and a sleeve 9. These two parts extend substantially parallel to the fuselage $f$ of the airplane and are formed of any suitable light metal.

The rear end of the plunger 8 fits within and is slidable and rotatable relatively to the front end of the sleeve 9. In order to minimize friction and to facilitate relative rotative and sliding movement of the plunger and the sleeve, the sleeve is provided at its front end with a bearing forming bushing 10 and the plunger is provided at its rear end with a bearing forming bushing 11. The bushing 10 fits within an annular seat 12 in the sleeve 9 and surrounds and engages the outer periphery of the plunger. The bushing 11 fits and is secured within an annular seat 13 at the extreme rear end of the plunger and engages the inner periphery of the sleeve 9, as shown in Figure 6. The plunger 8 embodies a reduced stem 14 at its front and is supported by a collar 15 and a bearing ring 16 so that it is freeely rotatable in either direction without axial displacement thereof relatively to the wing w of the airplane. The collar 15 fits on the stem 14 and is clamped by a nut 17 against a shoulder 18 so that it is fixed against rotation relatively to the plunger. The shoulder 18 is formed between the stem 14 and the front end of the plunger and engages directly the rear face of the collar 15. The nut 17 is connected by a screw thread connection to the extreme front end of the stem and through the medium of a sprocket 19 and a tubular spacer 20 jams the collar 15 against the shoulder 18. The sprocket 19 is disposed between the nut 17 and the spacer 20. It is keyed to the stem 14 and together with a chain 21 constitutes a connection whereby the plunger 8 is rotated in response to rotation or turning of the hand-wheel at the upper end of the control stick in the pilot's compartment. The bearing ring 16 is supported in fixed relation with respect to the wing w of the airplane by means of a pair of brackets 22 and consists of a pair of complemental ring-type sections 16ª. These sections 16ª, as shown in the drawings, are clamped together by means of bolts 23 and embody a pair of flanges which extend inwardly and are disposed adjacent to the front and rear face of the collar 15. The flanges are spaced sufficiently from the collar so that the collar together with the plunger 8 is free to rotate relatively to the bearing ring which is held against axial displacement with respect to the wing w. The brackets 22 are carried by the upper and lower rear spars of the wing and support the bearing ring 16 so that the latter in turn supports the plunger in a slightly tilted position with respect to the bottom surface of the wing, as shown in the drawings. The chain 21 extends around the sprocket 19 and then passes around a pair of sheaves 24 and a pair of sheaves 25 to a drum or like element on the wheel at the upper end of the control stick. The chain is so fixed to the drum that it operates through the medium of the sprocket 19 to rotate or turn the plunger 8 in response to turning of the wheel. The sheaves 24 and 25 are suitably supported and, as shown in the drawings, the sheaves 24 are housed in the inner end of the wing and the sheaves 25 are housed or disposed in the front end of the fuselage.

The sleeve 9 is provided at its rear end with a reduced extension piece 26. This extension is formed as an integral part of the sleeve and embodies at its rear end a hub-like formation 27. The latter, as shown in the drawings, has a cylindrical socket 28 and extends into the front lower corner portion of the aileron a of the airplane. The socket 28 extends transversely of the extension piece 26 and forms a bearing for a pair of eccentrics 29. These eccentrics, as shown in Figure 7, are coaxially arranged and embody at their inner ends cylindrical parts 30 which fit within the socket 28 and embody integral interfitting lugs 31, whereby the eccentrics are connected together for conjoint rotation within the socket of the hub formation 27. The eccentrics are locked in place by means of a key 32. This key is disposed in a groove 33 which is formed in the bottom portion of the hub formation 27 and faces and extends lengthwise of the socket 28. Two set screws 34 serve to jam or clamp the key 32 against the cylindrical parts 30 of the eccentrics 29. These screws extend transversely through the hub formation 27 and are disposed in laterally spaced relation. In order to prevent rotation of the cylindrical parts of the eccentrics with respect to the key 32, the inner face of the key is grooved longitudinally to form teeth 35 which fit within longitudinal grooves 36 in the peripheries of said cylindrical parts 30. When the set screws 34 are loosened the key 32 drops to the bottom of the groove 33 and releases the cylindrical parts 30 of the eccentrics so that the eccentrics are free to be rotated relatively to the hub formation. The eccentrics 29 have heads 37 in addition to the cylindrical parts 30. These heads are eccentrically positioned with respect to the parts 30 and lap the end faces of the hub formation 27. As shown in Figure 7 a hole 38 extends longitudinally through the eccentrics 29. This hole is centrally positioned with respect to the heads 37. It is eccentrically positioned with respect to the cylindrical parts 30 of the eccentrics and has counterbores 39 at its ends. A tubular spacer 40 extends through the hole 38 and is held in place by means of a pair of collars 41. These collars fit within the counterbores 39 and together with the tubular spacer 40 form a bearing or support for a pin 42. The ends of this pin project beyond the collars 41 and extend into slots 43 and a pair of plates 44 in the front lower corner portions of the aileron a. The pin 42 and the plates 44 constitute a pivotal connection between the hub formation 27 and the aileron whereby when the sleeve 9 is moved longitudinally relatively to the plunger 8 the aileron a is caused to swing upwards or downwards with respect to the wing w. The eccentrics 29 constitute simple and novel means for adjusting the position of the pivotal connection between the aileron and the hub formation.

The sleeve 9 is shifted longitudinally relatively to the plunger 8 for aileron swinging or controlling purposes by means of a roller 45 on the plunger and a cam slot 46 in the sleeve. The roller and cam slot form a connection whereby when the plunger is rotated in one direction by operation of the hand wheel at the upper end of the control stick in the pilot's compartment of the airplane the sleeve is shifted forwardly and thus causes the aileron to swing downwards, as shown in Figure 4, and when the plunger is rotated or turned in the opposite direction by way of manipulation of the aforesaid hand-wheel the sleeve is shifted rearwards relatively to the plunger and causes the aileron to swing upwards, as shown in Figure 3. The roller 45 fits and works in the slot 46 and is carried by a bolt 47. The latter extends transversely through the central portion of the plunger 8 and has at its outer end a nut 48 whereby the roller is held in the slot. The cam slot consists of an intermediate part 46ª and end parts 46ᵇ and 46ᶜ. The intermediate part of the slot is formed in the central portion of the sleeve and extends substantially at right angles to the sleeve. The roller 45, as shown in Figure 2, is disposed in the intermediate part 46ª of the cam slot when the aileron a is in its neutral position. Because the intermediate part 46a of the cam slot extends at right angles to the sleeve 9 of the control, the control when the aileron is in its neutral position is what may be termed "irreversible" in that the aileron a is locked against swinging movement and can be only shifted from its neutral position by turning of the plunger relatively to the sleeve by way of manipulation of the handwheel at the upper end of the control stick in the pilot's compartment of the airplane A. An advantage and characteristic of having the aileron control irreversible when the aileron is in, or close to, its neutral position is that fluttering of the aileron during flight or travel of the airplane is effectively prevented. The end part 46b of the cam slot is formed in and extends halfway around the front end of the sleeve 9. It is of extremely high pitch and when the roller 45 travels into it as the result of turning of the plunger 8 in one direction it coacts with the roller to cause the sleeve to move rearwards with respect to the plunger. This rearward movement of the sleeve in turn effects raising or upward swinging movement of the aileron a, as shown in Figure 3. By reason of the fact that the end part 46b of the cam slot is of comparatively high pitch the aileron a when swung upwards from its neutral position will, as the result of the pressure of the air thereon, tend to return to its normal position. Because of this, the aileron control is essentially reversible when the aileron is swung upwards out of its neutral position, as shown in Figure 3. The end part 46c of the cam slot is formed in, and extends half way around, the rear end of the sleeve. It joins the intermediate part 46a of the cam slot and when the plunger 9 is reversely rotated by manipulation of the handwheel in the pilot's compartment receives the roller 45 and coacts therewith to cause the sleeve to move forwards relatively to the plunger. During forward movement of the sleeve relatively to the plunger the aileron a is swung downwards, as shown in Figure 4. The pitch of the end section 46c of the cam slot is not quite as high or great as the pitch of the end section 46b. Because of this the downward swing of the aileron, due to a half turn of the plunger, is not as great as the up-swing of the aileron in response to a reverse half-turn of the plunger in the other direction from its neutral position. The pitch of the end section 46c is, however, sufficiently great or high so that upon release of the hand-wheel the aileron a will, in response to pressure of the air thereon, return from its down position to its neutral position. Because of the right angle position of the intermediate part 46a of the cam slot and the pitch of the end parts 46b and 46c of the slot, the control is irreversible only when the aileron is in or very close to its neutral position and is reversible in all other positions of the aileron. By having the control reversible in all positions of the aileron except when the aileron is in or close to its neutral position, the aileron will tend to return to its normal position upon release of the hand-wheel in the pilot's compartment and the pilot thus has what may be called "control feel" of the aileron. An additional advantage or characteristic of having the control irreversible only when the aileron is in or close to its neutral position, as contra-distinguished from irreversible in all positions of the aileron, is that the aileron when swung upwards or downwards for airplane maneuvering purposes, will tend to return to its neutral position and it is not necessary for the pilot of the airplane when travelling in rough air to manipulate the hand-wheel constantly in order to find or locate the neutral position of the aileron. By employing the eccentrics 29 the pivotal connection between the hub formation 27 and the aileron a may be adjusted so as to bring the aileron into its true neutral position when the roller 45 is positioned in the central portion of the intermediate part 46a of the cam slot 46.

In order to protect the cam slot 46a against the entry of anything which might cause the roller 45 to jam or lock therein, a tubular casing 49 is provided. This casing is of greater diameter than, and is concentrically positioned with respect to, the sleeve 9. It is held in place by means of a pin 50 on the sleeve and has inturned flange-like ends which fit against the ends of the sleeve, as shown in Figure 6.

The operation of the control is as follows: When it is desired to raise the aileron a from its neutral position, the hand-wheel at the upper end of the control stick in the pilot's compartment of the airplane is turned so as to cause through the medium of the chain 21 and the sprocket wheel 19 the plunger 8 to rotate in such a direction that the roller 45 is caused to move into the end part 46b of the cam slot 46. As the roller moves into this part of the cam slot, the sleeve 9 is caused to move rearwards relatively to the plunger and through the medium of the pivotal connection between the aileron and the hub formation 27 causes the aileron to swing upwards. The return of the aileron to its neutral position is effected by reversely rotating or turning the plunger 8. When the aileron is in its neutral position, as shown in Figure 2, the roller 45 is disposed in the intermediate part 46b of the cam slot and because of the position and arrangement of this part of the cam slot the aileron is locked in place against movement except by manipulation of the hand-wheel in the pilot's compartment. When it is desired to swing the aileron downwards, the hand-wheel is rotated or turned so as to rotate the plunger 8 in such direction that the roller 45 moves into the end part 46c of the cam slot. During movement of the roller into this part of the slot the sleeve moves forwards with respect to the plunger and causes the aileron to swing downwards into the position shown in Figure 4. As hereinbefore pointed out, the control is reversible except when the aileron is in or close to its neutral position and as a result the aileron, when raised or lowered with respect to the wing, will return automatically upon release of the hand-wheel in the pilot's compartment to its neutral position. The control is essentially a simple one and may be manufactured at a low and reasonable cost for the reason that it consists of but a small number of parts. Although not shown in the drawings, it is contemplated that there will be a control for each aileron of the airplane and that the drive chains for the plungers of the controls be connected to the drum or hub-part of the hand-wheel in the pilot's compartment so that one is moved in one direction and the other in the opposite direction when the wheel is turned. With this arrangement one of the ailerons is caused to move upwards and the other aileron is caused to move downwards when the hand-wheel is turned in one direction. Because the end part 46c of the cam slot 46 is of less pitch than the end part 46b, the aileron which is swung downwards will swing to a less extent than the aileron which is caused to be swung upwards.

Whereas the control has been described as an aileron control, it is to be understood that it may be used to control any movable airplane surface such as an elevator, rudder or servo vane. It is also to be understood that the invention is not to be restricted to the details set forth, since these may be modified within the scope of the appended claims, without departing from the spirit and scope of the invention.

Having thus described the invention, what I claim as new and desire to secure by Letters Patent is:

1. In combination with an airplane having a wing with an aileron hinged to the rear portion thereof to swing up or down from a neutral position to either an ordinary or extreme deflected position and back again, a control for the aileron comprising an actuating element in the pilot's compartment of the airplane, a sleeve connected pivotally to the front portion of the aileron and adapted in response to axial shift thereof to swing said aileron, a plunger having one end thereof fitting within the sleeve and its other end mounted in the wing so that said plunger is rotatable without axial displacement, means between the actuating element and said other end of the plunger for effecting rotation of the plunger in response to control movement of said element, and a roller and cam slot motion imparting connection between the plunger and sleeve operative in response to rotation of said plunger to shift the sleeve axially and thus effect swinging of the aileron, the slot of said connection being of helical design and formed in the sleeve and having the intermediate part thereof adapted to receive the roller when the aileron is in or near its neutral position and arranged so that when the roller is disposed therein the aileron is locked against swinging movement except by rotation of the plunger, and also having one end part thereof adapted to receive the roller when said plunger is rotated in one direction in order to swing upwards the aileron into its ordinary or extreme deflected position and curved and of such pitch that when the roller is therein the aileron is free so that it tends in response to flow of air thereagainst during flight of the airplane to return downwards to its neutral position, and its other end adapted to receive the roller when the plunger is rotated in the reverse direction in order to swing the aileron downwards into an ordinary or extreme deflected position and curved and of such pitch that when the roller is therein the aileron is free so that it tends in response to flow of air thereagainst during flight of the airplane to return upwards to its neutral position.

2. In combination with an airplane having a control surface mounted to swing from a neutral position to either an ordinary or extreme deflected position in either direction and back again, a control for the surface comprising an actuating element in the pilot's compartment of the airplane, a sleeve member, a plunger member having one end thereof fitting within one end of the sleeve member, the other end of one of the members being pivotally connected to the control surface and adapted in response to axial shift of said one member to swing the control surface, the other end of the other member being mounted with respect to a fixed part of the airplane so that said other member is rotatable without axial displacement, means between the actuating element and said other end of the other member for effecting rotation of the latter, and a roller and cam slot motion imparting connection between the one end of the two members operative in response to rotation of said other member to shift said one member axially and thus effect swinging of the control surface, the slot of said connection being of helical design and having the intermediate part thereof adapted to receive the roller when the control surface is in or near its neutral position and arranged so that when the roller is disposed therein said surface is locked against swinging movement except by rotation of said other member, and also having one end part thereof adapted to receive the roller when said other member is rotated in one direction in order to swing the control surface in one direction into its ordinary or extreme deflected position and curved and of such pitch that when the roller is therein the control surface is free so that it tends in response to flow of air thereagainst during flight of the airplane to return to its neutral position, and its other end adapted to receive the roller when said other member is rotated in the reverse direction in order to swing the control surface in the opposite direction into its ordinary or extreme deflected position and curved and of such pitch that when the roller is therein the control surface is free so that it tends in response to flow of air thereagainst during flight of the airplane to return to its neutral position.

HAROLD D. HOEKSTRA.